United States Patent
Zadka et al.

(10) Patent No.: US 9,054,995 B2
(45) Date of Patent: Jun. 9, 2015

(54) METHOD OF DETECTING MEASUREMENTS IN SERVICE LEVEL AGREEMENT BASED SYSTEMS

(75) Inventors: Moshe Zadka, Mevasseret-Zion (IL); Netta Gavrieli, Ramat-Gan (IL); Ido Barav, Tel Aviv (IL); Nadav Wexler, Tel Aviv (IL)

(73) Assignee: VMware, Inc., Palo Alto, CA (US)

( * ) Notice: Subject to any disclaimer, the term of this patent is extended or adjusted under 35 U.S.C. 154(b) by 641 days.

(21) Appl. No.: 12/603,310

(22) Filed: Oct. 21, 2009

(65) Prior Publication Data

US 2011/0093585 A1    Apr. 21, 2011

(51) Int. Cl.
- G06F 15/173 (2006.01)
- G06F 11/00 (2006.01)
- H04L 12/24 (2006.01)
- H04W 28/24 (2009.01)

(52) U.S. Cl.
CPC .......... H04L 41/5009 (2013.01); H04W 28/24 (2013.01); H04L 41/5003 (2013.01)

(58) Field of Classification Search
CPC   H04L 41/5009; H04L 41/5003; H04W 28/24
USPC .................................. 709/224–226; 370/252
See application file for complete search history.

(56) References Cited

U.S. PATENT DOCUMENTS

| | | | |
|---|---|---|---|
| 6,553,360 B1 * | 4/2003 | Hoekstra | 706/47 |
| 6,839,751 B1 * | 1/2005 | Dietz et al. | 709/224 |
| 7,886,031 B1 * | 2/2011 | Taylor et al. | 709/221 |
| 8,127,291 B2 * | 2/2012 | Pike et al. | 718/1 |
| 2005/0097206 A1 * | 5/2005 | Rabinovitch et al. | 709/224 |
| 2006/0189330 A1 * | 8/2006 | Nelson et al. | 455/457 |
| 2013/0247180 A1 * | 9/2013 | Camp | 726/22 |

* cited by examiner

*Primary Examiner* — Ranodhi Serrao
*Assistant Examiner* — Thomas Richardson

(57) ABSTRACT

A method and program product are provided for implementing object state changes in a data network system that includes at least one application having a plurality of objects. Each object is capable of being in of a plurality of different object states. The method comprises utilizing a network monitor to identify potential object state anomaly candidates from among the plurality of objects and utilizing object measurements taken during a predetermined time segment to determine if the current object state of a potential object state anomaly candidate should change from the current object state to an updated object state.

20 Claims, 4 Drawing Sheets

METHOD OF DETECTING MEASUREMENTS IN SERVICE LEVEL AGREEMENT BASED SYSTEMS

BACKGROUND

A service level agreement (SLA) records an understanding between a customer and a service provider regarding services to be provided, priorities, responsibilities, guarantees, warranties and other parameters of the understanding. Each object of service scope set forth in the SLA typically has a defined level of service. For example, the SLA may specify the levels of availability, serviceability, performance, operation and/or other attributes of the service. The level of service can be specified as a minimum or target level for the object, thereby allowing the customer to be informed regarding what to expect from the service while providing measurable values that show the actual level of performance. The actual level of performance is typically measured utilizing an SLA monitoring tool or "network sniffer."

An SLA based system is exemplary of any data network system that exhibits fluctuant measurement behavior. That is, every SLA monitoring tool is confronted with the task of recording a series of measurements of a number of metrics associated with objects of the SLA and issuing alerts based upon detection of anomalies in the metrics measurements, i.e., measurements that show the service performance to be less than the level of service specified in the SLA for that object. This task is difficult to fulfill because SLA measurements tend to have spikes and to exhibit inconsistent local behavior. Simple threshold-based decisions typically provide numerous false positives and a fluctuant alerts pattern that inhibit accurate analysis of system performance.

Standard SLA monitoring tools use raw measurements to perform stand-alone statistical calculations and then deduce the state of a particular performance object of the system as a result of these calculations. However, these calculations do not consider the current state of the performance object as a parameter. This means that the same measurements will always result in the same object state, regardless of the object's state prior to these measurements, or to a previous state change. The threshold conditions can be non-trivial, for example, requiring several threshold violations within a dynamic time-fragment, to minimize the chances of false positives. Nevertheless, fluctuant measurements behavior results in either fluctuant alerts patterns or too many false negatives (no identification when an anomaly situation occurs).

Thus, there is a need for an SLA monitoring tool that eliminates false positive anomaly detection while handling periodic spikes and fluctuant measurements characteristics.

SUMMARY

Embodiments of the concepts disclosed herein provide a method of implementing object state changes in a data network system that includes at least one application having a plurality of objects. Each object is capable of being in one of a plurality of different object states. The method comprises utilizing a network monitor to identify potential object state anomaly candidates from among the plurality of objects and utilizing object measurements taken during a predetermined time segment to determine if the current object state of a potential object state anomaly candidate should change from the current object state to an updated object state.

Embodiments of the concepts disclosed herein also provide a program product for use in a processor that executes program steps in a non-transitory computer readable medium comprising software instructions operable to perform a method of implementing object state changes in a data network that includes at least one application having a plurality of objects, each object being capable of being in one of a plurality of different object states. The program product comprises a recordable media and a program of computer-readable instructions executable by the processor to perform operations comprising: utilizing a network monitor to identify potential object state anomaly candidates from among the plurality of objects, each potential object state anomaly candidate having a current object state; and utilizing object measurements taken over a predetermined time segment to determine if the current object state of a potential object state anomaly candidate should change from the current object state to an updated object state.

DETAILED DESCRIPTION

Figure 1:
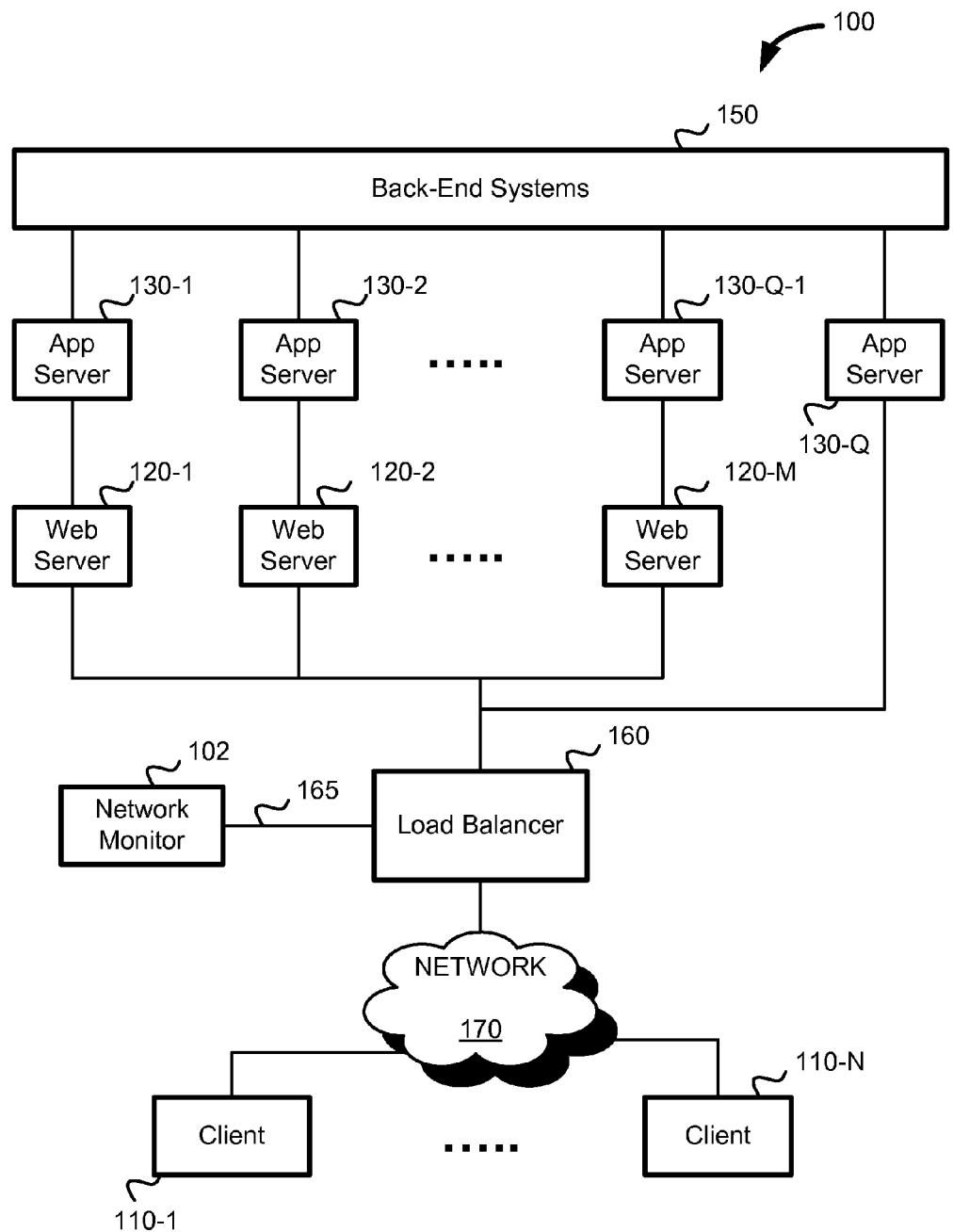
FIG. 1 is a block diagram illustrating an embodiment of a data network that includes network monitoring.

FIG. 1 shows an embodiment of a data network 100 that includes a network monitor 102 for monitoring the level of service provided by the data network 100 in accordance with predetermined performance criteria. For example, the level of service to be provided by the data network 100 could be defined by a service level agreement (SLA).

The data network 100 of FIG. 1 includes clients 110-1 through 110-N, web servers 120-1 through 120-M, application servers 130-1 through 130-Q connected to backend systems 150, a load balancer 160, and a network 170. As stated above, data network 100 also includes a network monitor 102 that measures activity relative to a plurality of objects included in data network 100 and, as described in greater detail below, utilizes the metrics to dynamically establish object states for each of the network objects. The network monitor also issues alerts if the object states do not meet specified criteria, e.g., a level of service defined by an SLA.

The connection of the network monitor 102 to the data network 100 as shown in Fig. is to be considered exemplary and non-limiting. The network monitor 102 can be connected to the data network 100 in various configurations, as disclosed in commonly-assigned and co-pending U.S. patent application Ser. No. 11/682,433, filed on Mar. 6, 2007. Application Ser. No. 11/682,433 is hereby incorporated by reference to provide additional background information regarding the present invention.

With continuing reference to FIG. 1, web servers 120 of data network 100 process requests sent from clients 110 and respond with the processing result. Application servers 130 execute the business logic of the web applications and communicate with backend systems 150, which implement the data layer of the applications. Load balancer 160 distributes incoming requests to servers 120 and 130 that run the applications to which the requests are targeted. Those skilled in the art will appreciate that the implementation of these functions is well known to those skilled in the art and that the configuration of the data network 100 shown in FIG. 1 is non-limiting and exemplary, the functionality of the data network 100 being capable of implementation in a number of different configurations. For purposes of the present invention it is noted that the data network 100 is disclosed as exemplary of a data system that exhibits fluctuant measurements behavior, e.g., a SLA-based system.

In accordance with embodiments disclosed herein, methods of detecting measurements anomalies in data network systems exhibiting fluctuant measurements behavior may be divided into two stages. A first stage is dedicated to isolating potential object state measurements anomaly candidates. A second stage is dedicated to a thorough investigation of each potential anomaly candidate to determine if a state change for that anomaly candidate should, in fact, be implemented.

The first stage of the process identifies all potential measurements anomalies using standard measurements analysis. The rationale for utilizing this first stage is that it is not practical to thoroughly investigate the status of all objects of the data network system being monitored using raw measurements values. The first stage is, therefore, a filter stage that marks specific objects at specific time fragments as measurement anomaly candidates that should be further investigated. Those skilled in the art will appreciate that this first "filter" stage should be configured so that it passes enough anomaly candidates so that suspicious events are investigated, but filters enough anomaly candidates so that the resources of the monitoring system are capable of coping with the investigations task of the second stage of the process.

The second stage of the process includes a state mitigation investigating analysis. The state mitigation investigating analysis is unique in that, while conventional state-decision processes examine raw measurements and perform stand-alone statistical calculations, the method of the invention adopts the approach that state-changes are usually rare and sparse occasions and that, thus, the statistical calculation must take into account both the current object state and the historical object state in order to reach a correct decision on a potential state change for that object. The method dynamically changes the time segment it relies upon, corresponding to the amount of data collected and the state-change history, thus enabling the handling of the fluctuant measurements behavior discussed above.

The second stage of the process implements the state mitigation investigating analysis in accordance with the following flow:

For each time segment (going from the largest scale to the smallest), and for each measurements anomaly candidate within the time segment, extract the number of hits on every monitored object associated with the anomaly candidate within the time segment.

For every object that has enough hits within that time segment, extract all relevant measurements (e.g., hits, latency, number of errors) within the given time segment, divided to a specific resolution (e.g., 1 minute); then generate a hits histogram according to the different states values (e.g., the different object state can be one of "OK", "Warning", "Passed SLA" and "Unavailable", so the hits histogram represents the amount of hits that each state-value had in that time segment); from the hits histogram and the previous state, calculate the new object's state in accordance with the state-change-decision procedure described below; if a state change has occurred, then issue the appropriate alert.

The state-change-decision procedure uses a predefined parameter: ratio. The flow of the state-change-decision procedure proceeds as follows: go over the different object-states values, from "OK" to the current state; if the percentage of hits in the potential state or better is greater than the ratio, then change the object's state to that state. Go over the different object's state values, in reverse order, from "Unavailable" to the current state; if the percentage of hits in the potential state or worse is larger than the ratio, then change the object's state to that state.

Figure 2:
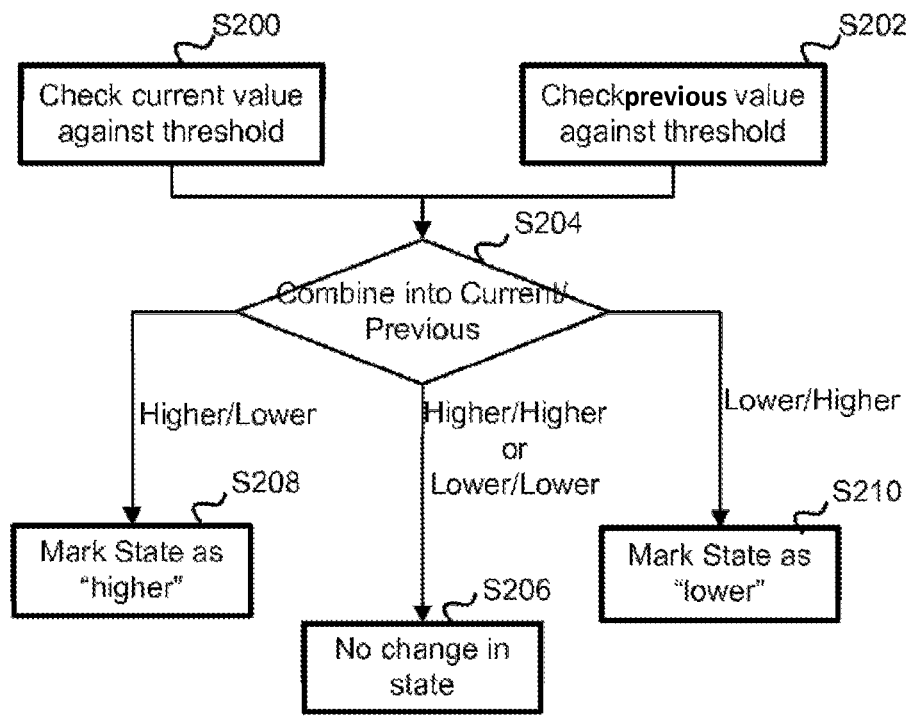
FIG. 2 is a flow chart illustrating identification of an object state anomaly candidate.

Embodiments of a process for detecting measurement anomalies are shown in the drawings. FIG. 2 shows the first stage of the process in which potential measurements anomalies are identified. In step S200, the current measurements value is checked against a threshold value that has been established, for example, in an SLA. In step S202, a determination is made as to whether the measurements value was previously higher or lower than the threshold value. In step S204, the result of the check of the current measurements value against the threshold value and the determination regarding whether the value was previously higher or lower than the threshold value are combined. As shown in FIG. 2, the step S204 combination leads to four possible results: (1) the current value is higher than the threshold value and the previous value was lower than the threshold value ("higher/lower"), (2) the current value is higher than the threshold value and the previous value was higher than the threshold value ("higher/higher"), (3) the current value is lower than the threshold value and the previous value was lower than the threshold value ("lower/lower"), and (4) the current value is lower than the threshold value and the previous value was higher than the threshold value ("lower/higher"). As further shown in FIG. 2, for the "higher/higher" and "lower/lower" cases, no change is made in the object state (step S206). However, for the "higher/lower" case, a potential "higher" object state measurements anomaly is identified (step S208). Similarly, for the "lower/higher" case, a potential "lower" object state measurements anomaly is identified (step S210).

Figure 3:
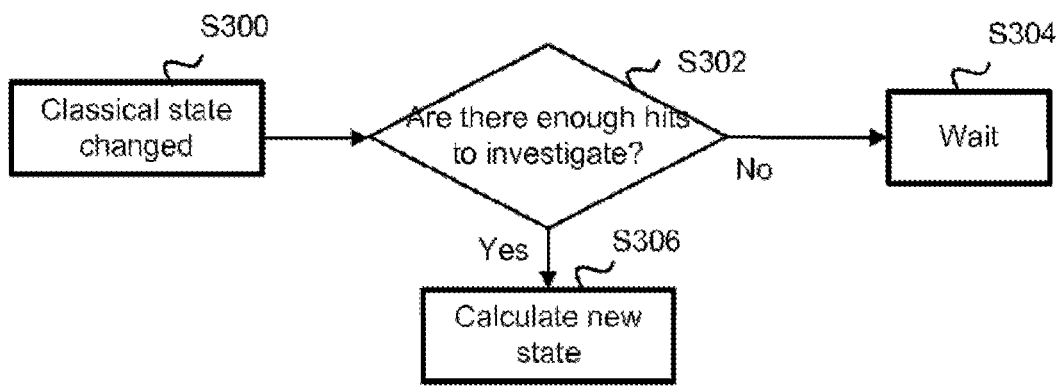
FIG. 3 is a flow chart illustrating a method of detecting measurements anomalies in accordance with embodiments of the present invention.

FIG. 3 shows an embodiment wherein, in the event that an object state has been marked either "higher" or "lower" as discussed above (step S300), then a determination is made as to whether there are enough hits respective that object to investigate whether or not to make a state change (step S302). If there have been less than a minimal number of hits for the given time period, then the investigation of whether or not to make an object state change is kept pending until there have been enough hits (step S304). If there have been enough hits, then, in step S306, a determination is made using the second stage state-change-decision procedure regarding whether or not to make a state change for that object. Those skilled in the art will appreciate that the measurements hits threshold for launching a state change investigation will depend upon user configuration. For example, the user could be provided with the option of setting the measurement hits threshold at either 1, 5, 50 or 500, with 50 being the default if the user does no manual configuration.

Figure 4:
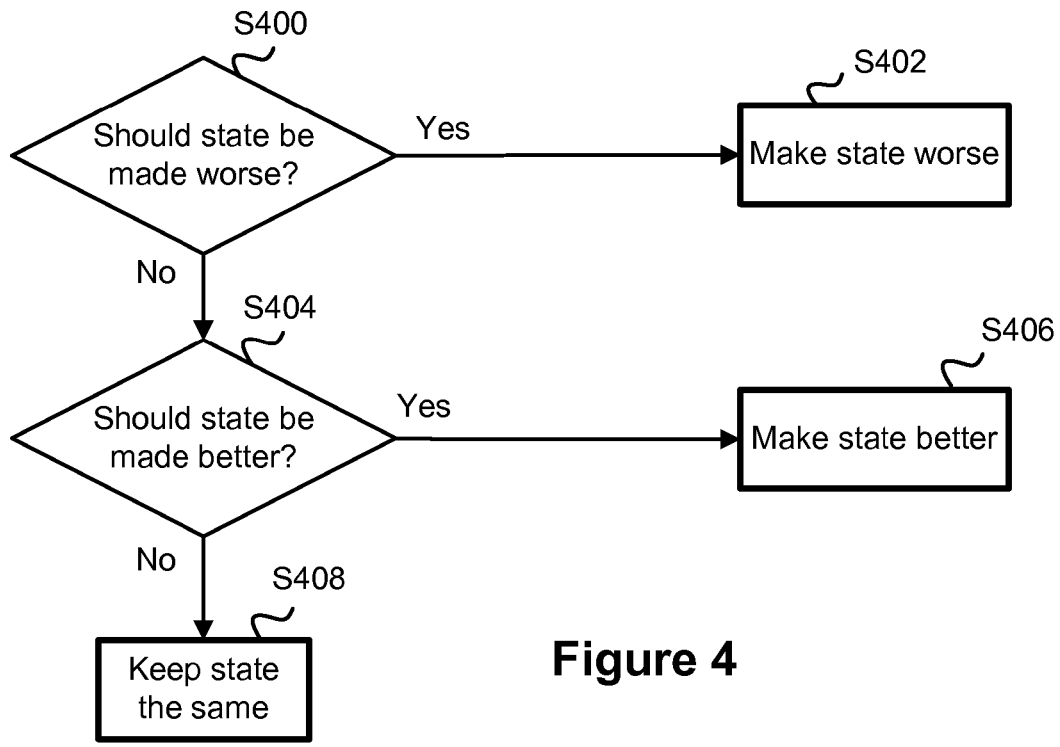
FIG. 4 is a flow chart illustrating calculation of a new object state in accordance with embodiments of the present invention.

FIG. 4 shows an embodiment for calculating a new state. As shown in FIG. 4, in investigating a measurements anomaly candidate identified, for example, according to first stage procedure described above, a state-change-decision procedure for making the object state worse is first invoked (step S400). If the state-change-decision criteria are met, then the state is made worse (step S402). If the criteria are not met for making the state worse, then a state-change decision procedure for making the object state better is invoked (step S404). If the criteria for making the state better are met, then the state is made better (step S406); if not, then the object state is kept the same (step S308).

Figure 5:
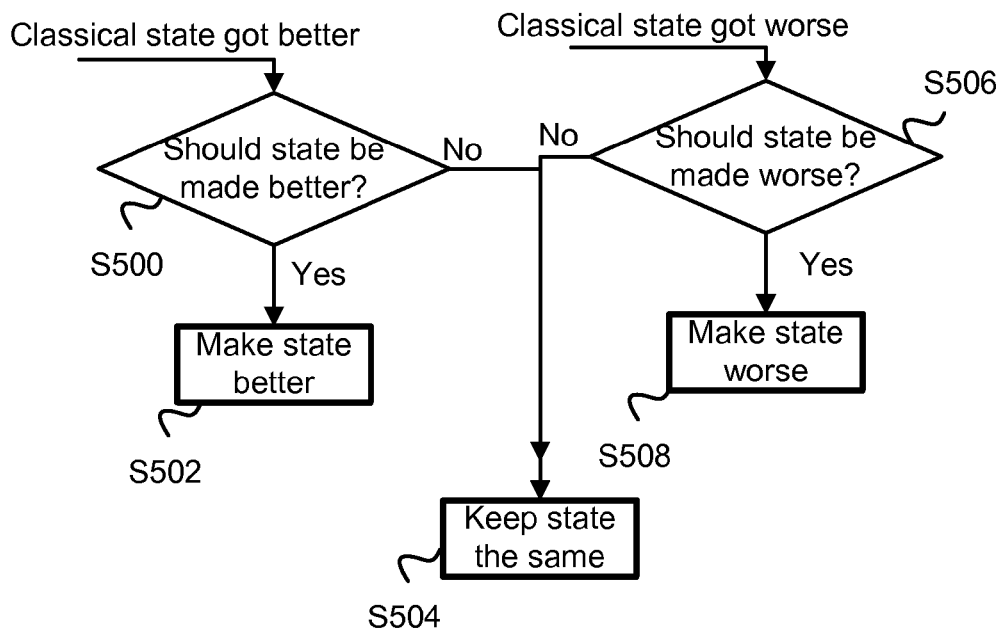
FIG. 5 is a flow chart illustrating calculation of a new object state in accordance with alternate embodiments of the present invention.

FIG. 5 shows an alternate embodiment for calculating a new state. As shown in FIG. 5, the starting point for calculating a new state in accordance with this embodiment depend upon with the stage one filtering method discussed above in conjunction with FIG. 2 identified a potential anomaly candidate as getting better or getting worse. If the anomaly candidate was identified as potentially getting better, then a state-change-decision procedure for making the state better is invoked (step S500). If the state-change-decision criteria are met, then the state is made better (step S502); if the criteria are not met, then the state remains the same (step S504). If, however, the anomaly candidate was identified as potentially getting worse, then a state-change-decision criteria for making the state worse is invoked (step S506). If state-change-decision criteria for making the state worse are met, the state is made worse (step S508); if the criteria are not met, then the state remains the same (step S504).

Figure 6:
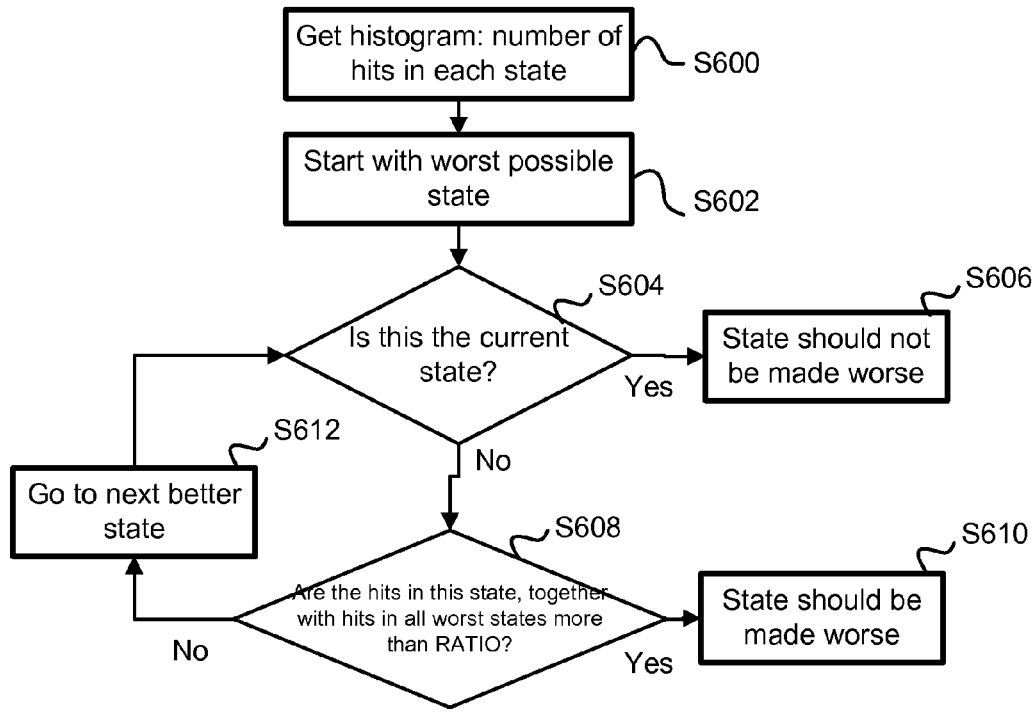
FIG. 6 is a flow chart illustrating a state-change-decision procedure for determining if an object's state should be made worse in accordance with embodiments of the present invention.

FIG. 6 shows an embodiment of a state-change-decision procedure for determining whether the state of a measurements anomalies candidate should be made worse. In step S600, a histogram is developed that identifies the number of object hits in each state. Then, starting with the worst possible state (step S602), it is determined whether or not this is the current state (step S604). If it is the current state, then, clearly, the state cannot be made worse (step S606). If the current state is not the worst possible state, then, in step S608, a determination is made as to whether the hits in this state together with the hits in all states worse than the current state exceed the ratio. If the ratio is exceeded, then the state is made worse (step S610). If the ratio is not exceeded, then the next better state is analyzed (step S612) beginning with step S604.

Figure 7:
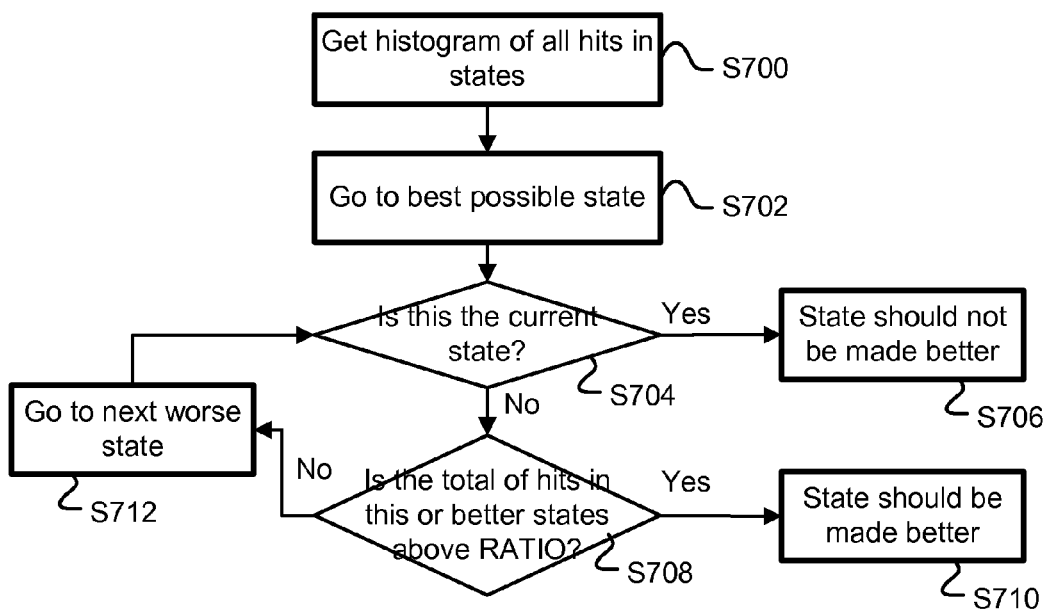
FIG. 7 is a flow chart illustrating a state-change-decision procedure for determining if an object's state should be made better in accordance with embodiments of the present invention.

FIG. 7 shows an embodiment of a state-change-decision procedure for determining whether the state of a measurements anomalies candidate should be made better. In step S700, a histogram is developed that identifies the number of object hits in each state. Then, starting with the best possible state (step S702), it is determined whether or not this is the current state (step S704). If it is the current state, then, clearly, the state cannot be made better (step S706). If the current state is not the best possible state, then, in step S708, a determination is made as to whether the hits in this state together with all hits in all states better than the current state exceed the ratio. If the ratio is exceeded, then the state is made better (step S710). If the ratio is not exceeded, then the next worse state is analyzed (step S712) beginning with step S704.

Two examples of embodiments provided below utilize a ratio=0.9. In other embodiments, a different ratio (e.g., 0.7) may be more appropriate to the particular application. Those skilled in the art will appreciate that, in all instances, the ratio must be greater than 0.5.

The following provides a first example of the state-change-decision procedure. In the example, the time segment that is checked is the last five minutes. One anomaly candidate of low latency was detected in that time segment. The relevant measurements, divided to a 1 minute resolution, are as follows:

| Time | Hits | State |
|---|---|---|
| 1 | 10 | OK |
| 2 | 3 | Warning |
| 3 | 1 | Passed SLA |
| 4 | 10 | OK |
| 5 | 0 | None (no hits are ignored) |

The resulting histogram according to the different state values is as follows:

| State | Hits |
|---|---|
| OK | 10 + 10 = 20 |
| Warning | 3 |
| Passed SLA | 1 |
| Unavailable | 0 |

The state-change-decision procedure provides the following, assuming that the ratio=0.9 and the current state is Passed SLA:

For potential state OK→(10+10)/24<0.9, therefore, the object's state cannot be set to OK.

For potential state Warning→(10+10+3)/24>0.9, therefore, the object's state can be changed to Warning.

The same procedure provides the following result if the current state is OK; since the state is OK, the procedure begins with the second "reverse order" analysis:

For potential state Unavailable→0/24<0.9, therefore, the object's state cannot be set to Unavailable.

For potential state Passed SLA→1/24<0.9, therefore, the object's state cannot be set to Passed SLA.

For potential state Warning→4/24<0.9, therefore, the object's state cannot be set to Warning.

The result is that the object's state remains OK.

The above example demonstrates the power of the state-change-decision procedure; the same histogram provides different results based upon the object's current state. If the object's current state is OK and only a small number of suspicious hits were observed, then the object's state should not be changed if most of the hits were actually OK. On the other hand, if the object's current state is Passed SLA, the there is still not enough evidence that everything is OK, and the object's state is changed to Warning. Upon observation of additional OK hits, the object's state will be changed to OK.

A second example demonstrates how the state-change-decision procedure handles fluctuant measurements behavior. Again, the time segment that is checked is the last five minutes, one anomaly candidate of low latency was detected in that time segment, and the relevant measurements are divided to a 1 minute resolution:

| Time | Hits | State |
|---|---|---|
| 1 | 7 | OK |
| 2 | 11 | Unavailable |
| 3 | 5 | OK |
| 4 | 9 | Unavailable |
| 5 | 8 | OK |

The resulting histogram according to the different states values is as follows:

| State | Hits |
| --- | --- |
| OK | 7 + 5 + 8 = 20 |
| Warning | 0 |
| Passed SLA | 0 |
| Unavailable | 11 + 9 = 20 |

A standard monitoring tool would issue an alert every minute, based upon "Unavailability" detection every minute. The state-change-decision procedure of the present invention, however, may issue an alert at the first time that these "Unavailable" hits are detected, but would soon "stick" to one state and would not change that state easily.

Assuming that the current state in this example is OK:

For potential state Unavailable→20/40<0.9, therefore, the state is not set to Unavailable.

For potential state Passed SLA→20/40<0.9, therefore, the state is not set to Passed SLA.

For potential state Warning→20/40<0.9, therefore, the state is not set to Warning.

Thus, the OK state remains.

Those skilled in the art will appreciate that a review of the histogram for this second example shows that the symmetrical calculation holds if the current state is Unavailable; the state remains Unavailable.

As with the first example, the behavior of the state-change-decision procedure in the second example makes sense. That is, if it is very difficult to decide whether the object's state is OK or not, it is best to stick to one state rather than to issue alerts in correspondence to the measurements fluctuations.

Those skilled in the art will appreciate that, while examples one and two above each use a 4-level states metric (i.e., OK, Warning, Passed SLA, Unavailable), the state-change-decision procedure can be applied to any n-level states metric. Furthermore, as stated above, its use is not restricted to SLA based systems, but is applicable to any system that exhibits fluctuant measurements behavior.

It should be noted that various modifications, combinations, sub-combinations and alterations of the above-described embodiments may occur, as required, insofar as they are within the scope of the appended claims or the equivalents thereof.

The concepts disclosed herein may be implemented as a combination of hardware and software. The software may be implemented as an application program tangibly embodied on a non-transitory program storage unit or computer readable medium, such as for example, a CD-ROM storage disc, magnetic floppy disc, magnetic tape, semiconductor memory chip or other medium well known to those skilled in the art. The application program may be uploaded to, and executed by, a machine comprising any suitable architecture, for example a computer platform having hardware such as one or more central processing units ("CPU"), a random access memory ("RAM"), and input/output ("I/O") interfaces. The computer platform may also include an operating system and microinstruction code. The various processes and functions described herein may be either part of the microinstruction code or part of the application program, or any combination thereof, which may be executed by a CPU, whether or not such computer or processor is explicitly shown.

It is to be further understood that, because some of the constituent system components and methods depicted in the accompanying drawings may be implemented in software, the actual connections between the system components or the process function blocks may differ depending upon the manner in which the present invention is programmed. Given the teachings herein, one of ordinary skill in the art will be able to contemplate these and similar implementations or configurations. All examples and conditional language recited herein are intended for pedagogical purposes to aid the reader in understanding the principles of the concepts contributed by the inventors to furthering the art, and are to be construed as being without limitation to such specifically recited examples and conditions.

All statements herein reciting principles, aspects, and embodiments, as well as specific examples thereof, are intended to encompass both structural and functional equivalents thereof. It is intended that such equivalents include both currently known equivalents as well as equivalents developed in the future, i.e., any elements developed that perform the same function, regardless of structure. Other hardware, conventional and/or custom, may also be included.

What is claimed is:

1. A method of implementing object state changes in a data network system that includes at least one application having a plurality of objects, each object capable of being in one of a plurality of different discrete object states arranged in an order from a lowest object state to a highest object state, the method comprising:

monitoring the data network using a network monitor to identify potential object state anomaly candidates from among the plurality of objects, each potential object state anomaly candidate having a current state, the current state being one of the plurality of different discrete object states arranged in the order from the lowest object state to the highest object state;

utilizing object measurements taken during a predetermined time segment to determine if the current object state of a potential object state anomaly candidate should change from the current object state to an updated object state, the updated object state being one of the plurality of different discrete object states that is lower or higher than the current object state;

generating a histogram for the potential object state anomaly candidate that identifies the number of object measurements in each of the plurality of different discrete object states within the predetermined time segment; and in response to determining that the current object state should change from the current object state to the updated object state, changing the current object state to the updated object state, wherein the step of utilizing object measurements comprises comparing the number of object measurements in one object state to the number of object measurements in another object state.

2. The method of claim 1, wherein the step of utilizing object measurements comprises:

determining if there have been a predetermined minimum number of object measurements related to a potential object state anomaly candidate; and deferring the initiation of the determination of whether the current object state of the potential object state anomaly candidate should change from the current object state to the updated object state if there has not been the predetermined minimum number of measurements.

3. The method of claim 1, wherein the step of utilizing object measurements comprises:

extracting all object measurements related to the potential object state anomaly candidate that occurred within the predetermined time segment;

reviewing the different discrete object states in the histogram sequentially from a best object state toward the current object state; and changing the current object state to a potential discrete object state if the percentage of total object measurements in the potential discrete object state in the sequence and in object states in the sequence that are better than the potential discrete object state is greater than a predetermined ratio.

4. The method of claim 1, wherein the step of utilizing object measurements comprises:

extracting all object measurements related to the potential object state anomaly candidate that occurred within the predetermined time segment;

reviewing the different discrete object states in the histogram sequentially from a worst object state toward the current object state; and changing the current object state to a potential discrete object state if the percentage of total object measurements in the potential discrete object state in the sequence and in object states in the sequence that are worse than the potential discrete object state is greater than the predetermined ratio.

5. The method of claim 1, wherein the step of monitoring the data network comprises:

checking a current measurement value of a particular object of the plurality of objects against a predetermined threshold value;

determining whether a previous measurement value of the particular object is higher or lower than the predetermined threshold value; and identifying the particular object as one of the potential object state anomaly candidates from among the plurality of objects if one of the current measurement value and the previous measurement value of the particular object is lower than the predetermined threshold value and if the other one of the current measurement value and the previous measurement value of the particular object is higher than the predetermined threshold value.

6. The method of claim 1, wherein the plurality of different discrete object states of a particular object include four different object states.

7. A method of implementing object state changes in a data network system that includes at least one application having a plurality of objects, each object capable of being in one of a plurality of different discrete object states arranged in an order from a lowest object state to a highest object state, the method comprising:

monitoring the data network using a network monitor to identify potential object state anomaly candidates, each potential object state anomaly candidate having an associated current state, the current state being one of the plurality of different discrete object states arranged in the order from the lowest object state to the highest object state;

determining, for each potential object state anomaly candidate, if there has been a predetermined minimum number of object measurements;

extracting all object measurements that occurred within a predetermined time segment if there has been a predetermined minimum number of object measurements;

generating a histogram for each potential object state anomaly candidate that identifies the number of object measurements in each of the plurality of different object states within the predetermined time segment;

reviewing the object states in the histogram sequentially to determine if the current state of the potential object state anomaly candidate should be changed to an updated object state, the updated object state being one of the plurality of different discrete object states that is lower or higher than the current object state; and in response to determining that the current state should be changed to the updated object state, changing the current state to the updated object state, wherein reviewing the object states in the histogram comprises comparing the number of object measurements in one object state to the number of object measurements in another object state.

8. The method of claim 7, wherein reviewing the object states in the histogram further comprises reviewing the different discrete object states in the histogram sequentially from the best object state toward the current object state.

9. The method of claim 8 further comprising changing the current object state to a potential discrete object state if the percentage of total object measurements in the potential discrete object state in the sequence and in object states in the sequence that are better than the potential discrete object state is greater than a predetermined ratio.

10. The method of claim 7, wherein reviewing the object states in the histogram sequentially further comprises reviewing the different discrete object states in the histogram sequentially from the worst object state toward the current object state if the percentage of total object measurements in a potential discrete object state and in object states in the sequence that are better than the potential discrete object state is not greater than a predetermined ratio.

11. The method of claim 10 further comprising changing the current object state to the potential discrete object state if the percentage of total object measurements in the potential discrete object state in the sequence and in object states in the sequence that are worse than the potential discrete object state is greater than a predetermined ratio.

12. A method of implementing object state changes in a data network system that includes at least one application having a plurality of objects, each object capable of being in one of a plurality of different discrete object states arranged in an order from a lowest object state to a highest object state, the method comprising:

monitoring the data network using a network monitor to identify potential object state anomaly candidates, each potential object state anomaly candidate having an associated current state, the current state being one of the plurality of different discrete object states arranged in the order from the lowest object state to the highest object state;

determining, for each potential object state anomaly candidate, if there have been a predetermined number of object measurements;

extracting all object measurements that occurred within a predetermined time segment if there have been a predetermined minimum number of object measurements;

generating a histogram for each potential object state anomaly candidate that identifies the number of object measurements in each of the plurality of different object states within the predetermined time segment;

reviewing the object states in the histogram sequentially to determine if the current state of the potential object state anomaly candidate should be changed to an updated object state, the updated object state being one of the plurality of different discrete object states that is lower or higher than the current object state; and in response to determining that the current state should be changed to the updated object state, changing the current state to the updated object state, wherein reviewing the object states in the histogram comprises comparing the number of object measurements in one object state to the number of object measurements in another object state.

13. The method of claim 12, wherein reviewing the object states in the histogram sequentially to determine if the current state of the potential object state anomaly candidate should be changed further comprises reviewing the different discrete object states in the histogram sequentially from the best object state toward the current object state if the potential object state anomaly candidate has been identified as a candidate for updating to a worse object state.

14. The method of claim 13 further comprising changing the current object state to a potential discrete object state if the percentage of total object measurements in the potential discrete object state in the sequence and in object states in the sequence that are better than the potential discrete object state is greater than a predetermined ratio.

15. The method of claim 12, wherein reviewing the object states in the histogram sequentially to determine if the current state of the potential object state anomaly candidate should be changed further comprises reviewing the different discrete object states in the histogram sequentially from the worst object state toward the current object state if the potential object state anomaly candidate has been identified as a candidate for updating to a better object state.

16. The method of claim 15 further comprising changing the current object state to a potential discrete object state if the percentage of total object measurements in the potential discrete object state in the sequence and in object states in the sequence that are worse than the potential object state is greater than a predetermined ratio.

17. A computer program product including a non-transitory computer readable medium comprising software instructions operable to enable a computer to perform a method for implementing object state changes in a data network system, comprising:
monitoring the data network using a network monitor to identify potential object state anomaly candidates from among the plurality of objects, each potential object state anomaly candidate having a current object state, the current state being one of a plurality of different discrete object states arranged in an order from a lowest object state to a highest object state;
utilizing object measurements taken over a predetermined time segment to determine if the current object state of a potential object state anomaly candidate should change from the current object state to an updated object state, the updated object state being one of the plurality of different discrete object states that is lower or higher than the current object state;
generating a histogram for the potential object state anomaly candidate that identifies the number of measurements in each of the plurality of different discrete object states within the predetermined time segment; and
in response to determining that the current object state should change from the current object state to the updated object state, changing the current object state to the updated object state,
wherein the step of utilizing object measurements comprises comparing the number of measurements in one object state to the number of measurements in another object state.

18. The computer program product of claim 17, wherein utilizing object measurements further comprises:
determining if there have been a predetermined minimum number of measurements during the predetermined time segment; and
deferring the initiation of the determination of whether the current object state of the potential object state anomaly candidate should change from the current object state to the updated object state if there has not been the predetermined minimum number of measurements.

19. The computer program product of claim 17, wherein utilizing object measurements further comprises:
extracting all measurements related to the potential object state anomaly candidate that occurred within the predetermined time segment;
reviewing the different discrete object states in the histogram sequentially from the best object state toward the current object state; and
changing the current object state to a potential discrete object state if the percentage of total measurements in the potential discrete object state in the sequence and in object states in the sequence that are better than the potential discrete object state is greater than a predetermined ratio.

20. The computer program product of claim 19, wherein utilizing object measurements further comprises:
extracting all measurements related to the potential object state anomaly candidate that occurred with the predetermined time segment;
reviewing the different discrete object states in the histogram sequentially from the worst object state toward the current object state; and
changing the current object state to a potential discrete object state if the percentage of total measurements in the potential discrete object state in the sequence and in object states in the sequence that are worse than the potential discrete object state is greater than the predetermined ratio.

* * * * *